(12) United States Patent
Yucel

(10) Patent No.: US 7,643,425 B2
(45) Date of Patent: Jan. 5, 2010

(54) LSP PATH SELECTION

(75) Inventor: Sakir Yucel, Wexford, PA (US)

(73) Assignee: Ericsson AB, Stockholm (SE)

( * ) Notice: Subject to any disclaimer, the term of this patent is extended or adjusted under 35 U.S.C. 154(b) by 573 days.

(21) Appl. No.: 10/898,060

(22) Filed: Jul. 23, 2004

(65) Prior Publication Data

US 2006/0018326 A1    Jan. 26, 2006

(51) Int. Cl.
  *H04L 12/28* (2006.01)
(52) U.S. Cl. .................. 370/238; 370/395.5
(58) Field of Classification Search .......... 370/397, 370/389, 395.21, 395.41, 468, 477, 392, 370/396, 395.3, 395.5, 400, 409, 235–238
  See application file for complete search history.

(56) References Cited

U.S. PATENT DOCUMENTS

| 6,363,319 B1* | 3/2002 | Hsu ............................ 701/202 |
| 6,859,842 B1* | 2/2005 | Nakamichi et al. .......... 709/238 |
| 2002/0059432 A1* | 5/2002 | Masuda et al. .............. 709/227 |
| 2002/0141345 A1* | 10/2002 | Szviatovszki et al. ....... 370/238 |
| 2003/0076829 A1* | 4/2003 | Rabie et al. ................. 370/391 |
| 2003/0103449 A1* | 6/2003 | Barsheshet et al. .......... 370/222 |
| 2003/0189919 A1* | 10/2003 | Gupta et al. ................. 370/351 |
| 2004/0052207 A1* | 3/2004 | Charny et al. ............... 370/216 |
| 2004/0218595 A1* | 11/2004 | Acharya et al. ............. 370/389 |
| 2005/0160171 A1* | 7/2005 | Rabie et al. ................. 709/227 |
| 2005/0243724 A1* | 11/2005 | Marasli et al. .............. 370/238 |
| 2005/0259586 A1* | 11/2005 | Hafid et al. ................. 370/241 |
| 2006/0039364 A1* | 2/2006 | Wright ....................... 370/352 |
| 2006/0182119 A1* | 8/2006 | Li et al. ................. 370/395.52 |
| 2006/0209785 A1* | 9/2006 | Iovanna et al. .............. 370/351 |
| 2007/0076601 A1* | 4/2007 | Wang et al. ................. 370/229 |

* cited by examiner

*Primary Examiner*—Kwang B Yao
*Assistant Examiner*—Kenan Cehic
(74) *Attorney, Agent, or Firm*—Ansel M. Schwartz

(57) ABSTRACT

A telecommunications system in a DiffServ aware Traffic Engineering (DS-TE) environment includes a plurality of source nodes from which LSPs arise. The system includes an MPLS network having DS-TE compliant routers and links with available bandwidth between the routers. The links having equal cost paths. Each router adding an LSP to a link as a function of available bandwidth. The plurality of source nodes in communication with the network. The MPLS network using a DS-TE bandwidth constraint model. The system includes a plurality of destination nodes in communication with the network which receives LSPs. A method for LSP path selection in a DiffServ aware Traffic Engineering environment.

11 Claims, 1 Drawing Sheet

LSP PATH SELECTION

FIELD OF THE INVENTION

The present invention is related to a telecommunications system in a DiffServ aware Traffic Engineering (DS-TE) environment with an MPLS network having links with equal cost paths where an LSP is added to a link as a function of available bandwidth. More specifically, the present invention is related to a telecommunications system in a DiffServ aware Traffic Engineering (DS-TE) environment with an MPLS network having links with equal cost paths where an LSP is added to a link as a function of available bandwidth and its class.

BACKGROUND OF THE INVENTION

DiffServ-aware Traffic Engineering (DSTE) is considered to accommodate traffic engineering requirements of the conceived future. DSTE allows different bandwidth constraints for different class types as well as different bandwidth constraint models for control of the class types. The present invention describes a technique to select the LSP, which improves the path selection algorithm toward fulfilling the network operators' optimization criteria. The criteria could be to accommodate more LSPs or to try to balance the utilization of equal cost paths in DS-TE environments.

Although DSTE provides effective bandwidth allocation mechanisms, Constrained Shortest Path First (CSPF) algorithms do not yet take the advantages of DSTE. The present invention takes into account the information advertised by DSCP in order to make better use of the network resources.

SUMMARY OF THE INVENTION

The present invention pertains to a telecommunications system in a DiffServ aware Traffic Engineering (DS-TE) environment. The system comprises a plurality of source nodes from which LSPs arise. The system comprises an MPLS network having DS-TE compliant routers and links with available bandwidth between the routers. The links having equal cost paths. Each router adding an LSP to a link as a function of available bandwidth. The plurality of source nodes in communication with the network. The MPLS network using a DS-TE bandwidth constraint model. The system comprises a plurality of destination nodes in communication with the network which receives LSPs.

The present invention pertains to a method for LSP path selection in a DiffServ aware Traffic Engineering environment. The method comprises the steps of determining how much bandwidth is available on each link of an MPLS network. There is the step of adding an LSP to a link of a plurality of links having equal cost paths, as a function of the available bandwidth on each link.

BRIEF DESCRIPTION OF THE DRAWINGS

In the accompanying drawings, the preferred embodiment of the invention and preferred methods of practicing the invention are illustrated in which.

DETAILED DESCRIPTION

Figure 2:
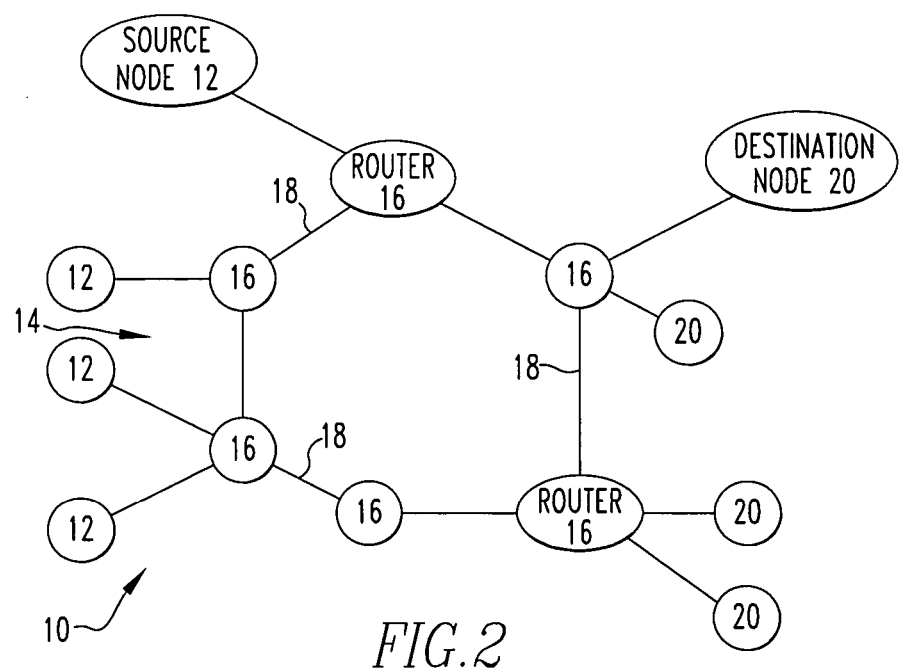
FIG. 2 is a schematic representation of a system of the present invention.

Referring now to the drawings wherein like reference numerals refer to similar or identical parts throughout the several views, and more specifically to FIG. 2 thereof, there is shown a telecommunications system 10 in a DiffServ aware Traffic Engineering (DS-TE) environment. The system 10 comprises a plurality of source nodes 12 from which LSPs arise. The system 10 comprises an MPLS network 14 having DS-TE constraint routers 16 and links 18 with available bandwidth between the routers 16. The links 18 having equal cost paths. Each router 16 adding an LSP to a link 18 as a function of available bandwidth. The plurality of source nodes 12 in communication with the network 14. The MPLS network 14 using a DS-TE bandwidth compliant model. The system 10 comprises a plurality of destination nodes 20 in communication with the network 14 which receives LSPs.

Preferably, the DS-TE compliant routers 16 advertising maximum reservable bandwidth for the links 18 and unreserved bandwidth for each traffic engineering (TE) class. Each router 16 preferably adds an LSP to a link 18 as a function of the link's bandwidth and its class. Preferably, the DS-TE compliant routers 16 allocate predetermined amount of bandwidth for traffic classes based on an allocation rule of the DS-TE bandwidth constraint model used in the network 14. Each router 16 preferably adds an LSP to a link 18 which has a greatest amount of available bandwidth. Preferably, each router 16 adds an LSP to a link 18 which has a least amount of available bandwidth.

The present invention pertains to a method for LSP path selection in a DiffServ aware Traffic Engineering environment. The method comprises the steps of determining how much bandwidth is available on each link 18 of an MPLS network 14. There is the step of adding an LSP to a link 18 of a plurality of links 18 having equal cost paths, as a function of the available bandwidth on each link 18.

Preferably, there is the step of allocating a predetermined amount of bandwidth for each link 18 per traffic class that is sent along the link 18. The adding step preferably includes the step of adding an LSP to a link 18 as a function of the link's bandwidth and its class. Preferably, the allocating step includes the step of identifying the amount of reduced bandwidth over all class types on a link 18 when allocating an LSP for a class type. The adding step can include the step of adding an LSP to a link 18 which has a greatest amount of reduced bandwidth over all class types. Alternatively, the adding step can include the step of adding an LSP to a link 18 which has a least amount of reduced bandwidth over all class types.

In the operation of the invention, DS-TE brings together the respective benefits of DiffServ and MPLS. More information about DS-TE can be obtained in the RFC 3564 at the IETF page www.ietf.org. The following definitions are taken from that RFC:

Class-Type (CT) is the set of Traffic Trunks crossing a link 18 that is governed by a specific set of Bandwidth constraints.

Bandwidth Constraint Model is the set of rules defining:
1. The maximum number of Bandwidth Constraints; and
2. Which CTs each Bandwidth Constraint applies to and how.

TE-Class is a pair of:
1. A Class-Type
2. A preemption priority allowed for that Class-Type.

DS-TE allows up to 8 bandwidth constraints with minimum 2 and 8 TE classes with minimum 2. Three bandwidth constraint models have been defined. They are explained below with examples rather than their formal definitions. Formal definitions can be found in the IETF TE working group page.

1. Maximum Allocation Model
   Suppose BC0=20, BC1=50, BC2=30 for CT0, CT1 and CT2.
   All LSPs from CT2 use no more than 30%.
   All LSPs from CT1 use no more than 50%.
   All LSPs from CT0 use no more than 20%.
2. Russian Doll Model
   Suppose BC0=100, BC1=80, BC2=60 for CT0, CT1 and CT2.
   All LSPs from CT2 use no more than 60%.
   All LSPs from CT1 or CT2 use no more than 80%.
   All LSPs from CT0 or CT1 or CT2 use no more than 100%.
3. Maximum Allocation with Reservation Model
   Suppose BC0=30, BC1=20, BC2=20 for CT0, CT1 and CT2.
   Suppose RBW_THRES=10.
   Under overload, if RESERVED_BW0=50, RESERVED_BW1=30, RESERVED_BW2=10;
   then the total UNRESERVED_BW=10.
   CT0 and CT1 can no longer increase bandwidth but CT2 can take additional bandwidth (up to 10 units)

With DS-TE extensions, IGPs advertise additional TE parameters. IGPs advertise the following for links:
1. Maximum reservable bandwidth for the link
2. Bandwidth constraint model and the bandwidth constraints
3. Overbooking factor IGPs advertise the following for label switched routers (LSR)s:
1. TE classes IGPs advertise the following for label switched paths (LSP)s:
1. Class type
2. Setup and holding priority
3. TE class Existing unreserved bandwidth sub-TLV in IGP advertisements is retained but its meaning is changed to refer to the unreserved bandwidth for each of the TE class (instead of referring to each preemption priority).

Although the DS-TE work presumes the constraint based routing algorithm in a DS-TE LSR to take this advertised unreserved bandwidth for satisfying the bandwidth constraint of an LSP request, it does not restrict the use of additional information provided by IGPs. DS-TE work suggests that additional information may be used as tiebreaker criteria in situations where multiple paths, otherwise equally attractive, are possible. The information provided by IGP extensions can be used to improve on the objective of the network 14 operator. The operator may want to maximize the number of LSPs that can be supported for a given source destination path. Alternatively, the operator may want to keep the utilization of the paths balanced.

To give an example for the first objective, consider the constraint based routing algorithm that produces multiple paths matching the bandwidth constraints between a source and a destination. Since DS-TE allows different bandwidth constraints to share common bandwidth partitions, a traditional algorithm that does not take the DS-TE information into account may select a path for the LSP that result in reducing the unreserved bandwidth for other bandwidth constraints, thus increasing the blocking probability of successive LSPs on that path. Due to this selection, a successive LSP request (with another class type) may be rejected for the given source-destination pair, although the same LSP could have been admitted had the algorithm selected another path for the previous LSP.

Two techniques are described below to resolve the case of multiple equal cost paths:
1. Technique that takes into account the maximum reservable bandwidth:

In case of multiple equal cost paths satisfying the bandwidth constraint, in order to select among those paths, the method described here first takes into account the maximum reservable bandwidth for the path, MB(P), which is defined as:

MB(P)=min {MB(L)} where MB(L) is the maximum reservable bandwidth for the link L advertised by IGP. MB(P) is the minimum of all the links on the path.

The MB(L) refers to the aggregate bandwidth constraints across all class types for the link L. Therefore, the minimum of all such values over a path is very valuable information as it suggests the overall available bandwidth across all traffic class types for the path. The path selection algorithm may either choose the path with lowest maximum reservable bandwidth or the one with highest based on the objective. If the objective is to accommodate as many LSPs as possible, it selects the path with lowest maximum reservable bandwidth so that a successive LSP request can be more easily admitted by the other paths with higher maximum reservable bandwidth. If the objective is to maintain balanced utilization among different paths, it selects the path with highest maximum reservable bandwidth. This objective is provided by the users of the constraint based routing algorithm that implements this method.

Figure 1:
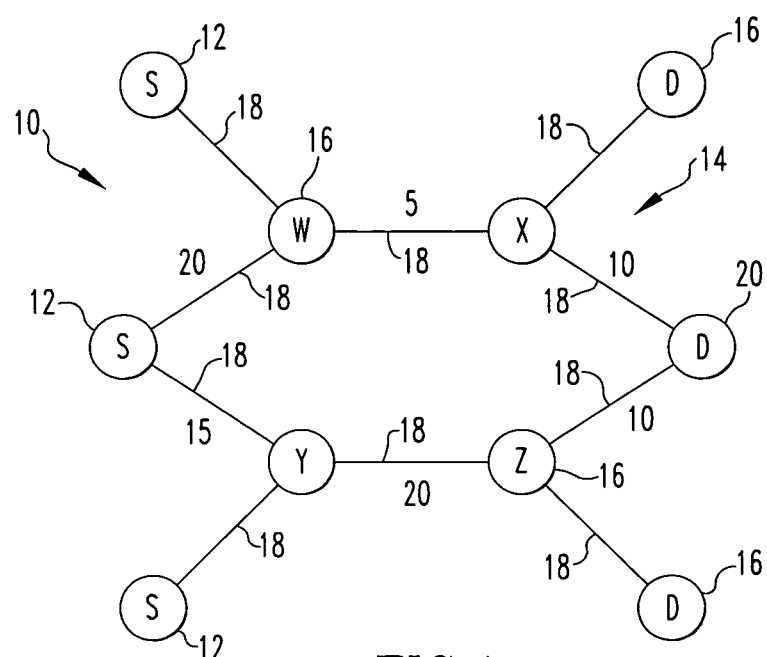
FIG. 1 shows two alternative paths from source to destination.

This technique is illustrated in FIG. 1. FIG. 1 shows two paths from source node S to destination node D as calculated by a classical constraint based routing algorithm for an LSP request with 5 units of bandwidth. The first path is through the links SWXD and the second is through SYZD. The numbers beside the links 18 indicate the maximum reservable bandwidth for the link 18, which is advertised by IGPs. Both the paths satisfy the bandwidth requirement of the new LSP request, which is 5 units of bandwidth.

With this notation, MB(SW) is 20, that is, the maximum reservable bandwidth for link SW is 20 units, whereas, MB(WX) is 5, and so on. The technique described here is applied on the two paths: MB(SWXD), that is, the maximum reservable bandwidth for the path SWXD is min {20, 5, 10}=5. MB(SYZD)=min {15, 20, 10}=10.

If the objective is to accommodate as many LSPs as possible, the path SWXD would be selected since it has the smaller MB value. With this selection, the new advertised maximum reservable bandwidth values for the links are 15, 0 and 5 over the links on path SWXD. The values on the path SYZD do not change. With this selection, it is possible to accommodate another new LSP request with up to 10 units of bandwidth over the other path, that is SYZD. Had the path SYZD been selected at the first place, the maximum reservable bandwidth values for the links 18 over that path would have been 10, 15 and 5. The values for the path SWXD would not have been changed. In this situation, it would not have been possible to accommodate a new LSP request with bandwidth requirement of 10 units. Only LSPs with only up to 5 units of bandwidth could have been accommodated.

If the objective is to maintain balanced utilization among different paths, the path SYZD is selected since it has the bigger MB value. This selection makes the two paths more evenly utilized. Service providers may chose this objective to keep the utilization of the links 18 in their network balanced so that the traffic is distributed evenly over the network 14 and thus the congestion on certain links 18 may be eliminated.

The technique described here supports both of these objectives.

The technique that takes into account the negative effect of reserving bandwidth in a TE class on other TE classes:

Even when the technique described above, there could still be multiple paths satisfying the bandwidth constraint with the same maximum reservable bandwidth. In such a case, the technique described here takes into account the negative effect of reserving bandwidth in a TE class on other TE classes. The bandwidth constraint models in DS-TE may allow different bandwidth constraints to share common bandwidth partitions. An LSP established in a given bandwidth constraint may reduce the unreserved bandwidth for other bandwidth constraints, thus increasing the blocking probability of successive LSPs. If the objective is to accommodate more LSPs, the constrained based routing algorithm selects the path that minimizes the negative effect of reserving bandwidth in a TE class on other TE classes for the purpose of accommodating new LSP requests that would otherwise be rejected. If the objective is to balance the utilization of traffic class types among different paths, it selects the path that has the maximum negative value.

While the constraint based routing algorithm is calculating the paths, it maintains a vector <pathid, $\beta(P)$> for each path that satisfies the bandwidth constraint of the LSP where $\beta(P)$ represents the negative effect value of selecting this path on the unreserved bandwidth of all TE classes. $\beta(P)$=sum ($\beta(L)$) for every link L on path P.

Similarly, $\beta(L)$ represents the negative effect value on the link L.

$\beta(L)$ is calculated as follows:

Given
    M, the bandwidth constraint model,
    BC[k], 0<<k<<7, the eight bandwidth constraints,
    UB[k], 9<<k<<7, the eight unreserved bandwidths for the link from the IGP advertisements, and
    the requested bandwidth B for the LSP with TE class i begin
if M is Maximum Allocation Model return 0.
Set initial value of $\beta(L)$ to 0
Allocate bandwidth B from the TE class i
    With new allocation, calculate the new unreserved bandwidth for each TE class into temporary vector of NUB $\beta(L)$= sum (UB[k]−NUB[k]), 0<<k<<7 return $\beta(L)$ end

Once the $\beta(P)$ values are calculated for each path that satisfies the bandwidth request for a new LSP, this technique selects the one with minimum or the maximum $\beta(P)$ value depending on the objective.

Calculation of the new unreserved bandwidth is performed based on the bandwidth constraint model. This technique assumes the default calculation of unreserved bandwidth as explained in the respective drafts of each bandwidth constraint model. An example will be provided to show the unreserved bandwidth calculation for Russian Doll Model below. The following calculation method is taken from the "Russian Dolls Bandwidth Constraints Model for Diff-Serv-aware MPLS Traffic Engineering" Internet draft at the JETF Internet Traffic Engineering (TEWG) page.

If CTc=CT0, then "Unreserved TE-Class [i]"=[BC0−SUM (Reserved(CTb,q))] for q<=p and 0<=b<=2
    If CTc=CT1, then "Unreserved TE-Class [i]"=MIN [[BC1−SUM(Reserved(CTb,q))] for q<=p and 1<=b<=2, [BC0−SUM(Reserved(CTb,q))] for q<=p and 0<=b<=2]
    If CTc=CT2, then "Unreserved TE-Class [i]"=MIN [[BC2−SUM(Reserved(CTb,q))] for q<=p and 2<=b<=2, [BC1−SUM(Reserved(CTb,q))] for q<=p and 1<=b<=2, [BC0−SUM(Reserved(CTb,q))] for q<=p and 0<=b<=2]

This is the standard calculation for unreserved bandwidth for TE classes for three class types. The draft generalizes this formulation for eight class types. The routers 16 use this formulation to calculate the unreserved bandwidth for TE classes and advertise them to other routers 16 in the network 14. In this calculation, SUM (Reserved(CTb,q)) refers to the reserved bandwidth for class type b across all preemption priorities. For simplicity, it is notated as RB(CTb), that is the reserved bandwidth of class type b.

In our example, suppose BC0=100, BC1=80 and BC2=60 for three class types CT0, CT1 and CT2. Assume only 3 class types in this example.

Suppose the current load on a link 18 for these class types is 10, 20 and 30 units of bandwidth respectively for CT0, CT1 and CT2. That is, RB(CT0)=10, RB(CT1)=20, RB(CT2)=30. Call this link Link-X. By using the formulation above, calculate the unreserved bandwidth for each TE classes. For simplicity, assume that each TE class corresponds to a class type and there is only one level of preemption priority. This means, the unreserved bandwidth for TE class 0 can be considered as the unreserved bandwidth for class type 0. With this simplistic assumption for this example, the notation UB(b) is used for the unreserved bandwidth for class type b. Note that, for this example, this is equivalent to unreserved bandwidth for TE class b, which is to be advertised by IGPs.

UB(0)=BC0−SUM(RB(CT0), RB(CT1), RB(CT2))=100−(10+20+30)=100−60=40.
UB(1)=min [[BC1−SUM(RB(CT1), RB(CT2))], UB(0)]= min [[80−(20+30)], 40]=min [30, 40]=30.
UB(2)=min [[BC2−SUM(RB(CT2))], UB(1), UB(0)]=min [[60−30], 30, 40]=min [30, 30, 40]=30.

The values of 40, 30 and 30 are advertised by IGPs for TE classes 0, 1 and 2.

Now, consider another link with 10, 0 and 50 units of bandwidth allocated, that is, class type 0 has already allocated 10 units of bandwidth, class type 2 has allocated 50 units of bandwidth and class type 1 has not allocated any bandwidth on this link. Call this link Link-Y. Calculating the unreserved bandwidth for each TE classes yields:

UB(0)=BC0−SUM(RB(CT0), RB(CT1), RB(CT2))=100−(10+0+50)=100−60=40.
UB(1)=min [[BC1−SUM(RB(CT1), RB(CT2))], UB(0)]= min [[80−(0+50)], 40]=min [30, 40]=30.
UB(2)=min [[BC2−SUM(RB(CT2))], UB(1), UB(0)]=min [[60−50], 30, 40]=min [10, 30, 40]=10.

Thus, 40, 30 and 10 are advertised by IGPs as the unreserved bandwidth for TE classes 0, 1 and 2.

Now, assume a new LSP request arrives with 10 units of bandwidth requirement for class type 1. Now the negative effect on links Link-X and Link-Y is calculated. First on Link-X.

Accepting the new LSP on Link-X, the new allocated bandwidth values would be 10, 30 and 30 for class types 0, 1 and 2, that is, now, RB(CT0)=10, RB(CT1)=30, RB(CT2)=30. Calculating the new unreserved bandwidth values for all TE classes yields:

UB(0)=BC0−SUM(RB(CT0), RB(CT1), RB(CT2))=100−(10+30+30)=100−70=30.
UB(1)=min [[BC1−SUM(RB(CT1), RB(CT2))], UB(0)]= min [[80−(30+30)], 30]=min [20, 30]=20.
UB(2)=min [[BC2−SUM(RB(CT2))], UB(1), UB(0)]=min [[60−30], 20, 30]=min [30, 20, 30]=20.

The new advertised values would be 30, 20 and 20 for TE classes 0, 1 and 2. These are the NUB values in the description of the algorithm above. Previously, the UB(0) was 40, now it is 30, the difference is 10. Similarly, the difference for UB(1) and UB(2) are 10 and 10 respectively. Adding all these differences, the negative effect on this link is 30. It is the β(L) in the description of the algorithm. Hence, β(Link-X)=30.

Now, calculate the negative effect if the new LSP request on Link-Y is accepted. The new allocated bandwidth values would be 10, 10 and 50, that is, now, RB(CT0)=10, RB(CT1)=10, RB(CT2)=50. Calculating the new unreserved bandwidth values for all TE classes yields:

UB(0)=BC0−SUM(RB(CT0), RB(CT1), RB(CT2))=100−(10+10+50)=100−70=30.

UB(1)=min [[BC1−SUM(RB(CT1), RB(CT2))], UB(0)]= min [[80−(10+50)], 30]=min [20, 30]=20.

UB(2)=min [[BC2−SUM(RB(CT2))], UB(1), UB(0)]=min [[60−50], 20, 30]=min [10, 20, 30]=10.

The difference between the new advertised values and the previous ones are 10, 10 and 0, with a total negative effect value of 20. Then, β(Link-Y)=20.

This example showed how to calculate the negative effect on a link 18. It is the β(L) in the description of the algorithm. The negative effect on a path is given by β(P)=sum (β(L)) for every link L on path P. If the objective is to accommodate more LSPs, the constrained based routing algorithm selects the path that minimizes the negative effect of reserving bandwidth in a TE class on other TE classes for the purpose of accommodating new LSP requests that would otherwise be rejected. This is because an LSP established in a given bandwidth constraint may reduce the unreserved bandwidth for other bandwidth constraints as the bandwidth is shared among the class types. Looking at the example above, the negative effect of accepting a new LSP with a 10 units of bandwidth requirement is bigger on Link-X than accepting it over Link-Y. Note, however that, the example shows the negative effect on the link only, not over a complete path. The algorithm described here takes the negative effect over the complete path. If the objective is to balance the utilization of traffic class types among different paths, it selects the path that has the maximum negative value.

This technique holds for the Maximum Allocation with Reservation Model as well basically because the bandwidth is shared among the different traffic class types in that model, too. With maximum allocation model, on the other hand, each bandwidth constraint is independent and separated from each other. Increasing the allocated bandwidth of a class type doesn't affect the unreserved bandwidth of other class types at all. Therefore, on links with maximum allocation model, the β(L) will always be 0. This fact is incorporated at the beginning of the description of the algorithm. For links with other bandwidth constraints, β(L) will have a nonzero value. Since network operators may employ any of the three bandwidth constraint models for each link, β(L) will be obtained based on the constraint model of the link 18.

Calculating the new unreserved bandwidth is done in O(k), that is in linear time. Given that DS-TE allows up to 8 TE classes and bandwidth constraints, the additional execution overhead of this algorithm is also O(k) per path, making this method very efficient improvement over the traditional Constrained Shortest Path First (CSPF) algorithms. It can be used both as a tiebreaker among equal cost paths as well as the generic decision to select the path among all the paths that satisfy the bandwidth constraint.

After executing this technique, if there is still multiple paths with the same β(P), the algorithm shall continue with employing its original criteria.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system in a DiffServ aware Traffic Engineering (DS-TE) environment comprising:
    a plurality of source nodes from which LSPs (label switched paths) arise;
    an MPLS network having DS-TE compliant routers and links with available bandwidth between the routers, the links having equal cost paths, the DS-TE compliant routers advertising maximum reservable bandwidth for the links, the bandwidth constraint model, and an overbooking factor and unreserved bandwidth for each traffic engineering (TE) class, each router adding an LSP to a link as a function of available bandwidth; the maximum reservable bandwidth for the links, the bandwidth constraint model, the overbooking factor and the unreserved bandwidth for each TE class used as tie breaker criteria to choose a link from multiple links having equal cost paths, the plurality of source nodes in communication with the network, the MPLS network using a DS-TE bandwidth constraint model; and
    a plurality of destination nodes in communication with the network which receives said LSPs.

2. A system as described in claim 1 wherein each router adds said LSP to said link as a function of the link's bandwidth and its class.

3. A system as described in claim 2 wherein the DS-TE complaint routers allocate predetermined amount of bandwidth for traffic classes based on an allocation rule of the DS-TE bandwidth constraint model used in the network.

4. A system as described in claim 3 wherein each router adds said LSP to a link which has a greatest amount of available bandwidth.

5. A system as described in claim 3 wherein each router adds said LSP to a link which has a least amount of available bandwidth.

6. A method for LSP path selection in a DiffServ aware Traffic Engineering (DS-TE) environment comprising the steps of:
    identifying a plurality of links having equal cost paths;
    determining how much bandwidth is available on each link of an MPLS network;
    advertising maximum reservable bandwidth for the links, the bandwidth constraint model, and an overbooking factor and unreserved bandwidth for each traffic engineering (TE) class by DS-TE compliant routers of the network; and
    adding an LSP (label switched path) to a link of the plurality of links having equal cost paths, as a function of the available bandwidth on each link; the maximum reservable bandwidth for the links, the bandwidth constraint model, the overbooking factor and the unreserved bandwidth for each TE class used as tie breaker criteria to choose a link from multiple links having equal cost paths.

7. A method as described in claim 6 including the step of allocating a predetermined amount of bandwidth for each link per traffic class that is sent along the link.

8. A method as described in claim 7 wherein the adding step includes the step of adding said LSP to said link as a function of the link's bandwidth and its class.

9. A method as described in claim 8 wherein the allocating step includes the step of identifying the amount of reduced bandwidth over all class types on said link when allocating said LSP for a class type.

10. A method as described in claim 9 wherein the adding step includes the step of adding said LSP to a link which has a greatest amount of reduced bandwidth over all class types.

11. A method as described in claim 9 wherein the adding step includes the step of adding a LSP to a link which has a least amount of reduced bandwidth over all class types.

* * * * *

UNITED STATES PATENT AND TRADEMARK OFFICE
CERTIFICATE OF CORRECTION

PATENT NO. : 7,643,425 B2 Page 1 of 1
APPLICATION NO. : 10/898060
DATED : January 5, 2010
INVENTOR(S) : Yucel It is certified that error appears in the above-identified patent and that said Letters Patent is hereby corrected as shown below:

In Column 5, Line 33, delete "$9<<k<<7$," and insert -- $0<<k<<7$, --, therefor.

In Column 5, Line 58, delete "JETF" and insert -- IETF --, therefor.

In Column 8, Line 37, in Claim 3, delete "complaint" and insert -- compliant --, therefor.

In Column 10, Line 5, in Claim 11, delete "a LSP" and insert -- said LSP --, therefor.

Signed and Sealed this

Twenty-seventh Day of April, 2010

David J. Kappos
*Director of the United States Patent and Trademark Office*